United States Patent
Nakamura et al.

(10) Patent No.: US 9,653,739 B2
(45) Date of Patent: May 16, 2017

(54) ELECTRICAL CONNECTION MATERIAL FOR SOLID OXIDE FUEL CELL, SOLID OXIDE FUEL CELL, SOLID OXIDE FUEL CELL MODULE, AND METHOD FOR MANUFACTURING SOLID OXIDE FUEL CELL

(71) Applicant: Murata Manufacturing Co., Ltd., Nagaokakyo-shi, Kyoto-fu (JP)

(72) Inventors: Kenji Nakamura, Nagaokakyo (JP); Tomoaki Hirai, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/945,873

(22) Filed: Nov. 19, 2015

(65) Prior Publication Data

US 2016/0072147 A1    Mar. 10, 2016

Related U.S. Application Data

(60) Division of application No. 14/159,601, filed on Jan. 21, 2014, now Pat. No. 9,368,808, which is a
(Continued)

(30) Foreign Application Priority Data

Jul. 21, 2011    (JP) .................. 2011-159705

(51) Int. Cl.
*H01M 8/24* (2016.01)
*H01M 8/02* (2016.01)
(Continued)

(52) U.S. Cl.
CPC ....... *H01M 8/0245* (2013.01); *H01M 8/0215* (2013.01); *H01M 8/0228* (2013.01);
(Continued)

(58) Field of Classification Search
CPC ............. H01M 8/0236; H01M 8/0245; H01M 8/1246; H01M 8/0228; H01M 8/0215; H01M 8/2425
See application file for complete search history.

(56) References Cited

U.S. PATENT DOCUMENTS

2004/0175604 A1* 9/2004 Ito ..................... B32B 18/00
429/454
2005/0208355 A1 9/2005 Kaga
(Continued)

FOREIGN PATENT DOCUMENTS

CN       1976108 A     6/2007
CN     101443947 A     5/2009
(Continued)

OTHER PUBLICATIONS

PCT/JP2012/068217 ISR dated Apr. 9, 2012.
PCT/JP2012/068217 Written Opinion dated Apr. 9, 2012.

*Primary Examiner* — Stewart Fraser
(74) *Attorney, Agent, or Firm* — Arent Fox LLP

(57) ABSTRACT

A method for manufacturing solid oxide fuel cells, which includes preparing an electrical connection material, preparing a stacked body by stacking a plurality of power generation cells with the electrical connection material interposed therebetween, and firing the stacked body while applying pressure on the stacked body in a direction of stacking the power generation cells. The electrical connection material includes a ceramic porous layer and a ceramic dense layer stacked on the ceramic porous layer, the ceramic dense layer having a porosity lower than a porosity of the ceramic porous layer.

6 Claims, 9 Drawing Sheets

Related U.S. Application Data continuation of application No. PCT/JP2012/068217, filed on Jul. 18, 2012.

(51) Int. Cl.

| | | |
|---|---|---|
| *H01M 8/12* | (2016.01) | |
| *H01M 8/0245* | (2016.01) | |
| *H01M 8/0236* | (2016.01) | |
| *H01M 8/0215* | (2016.01) | |
| *H01M 8/1246* | (2016.01) | |
| *H01M 8/2425* | (2016.01) | |
| *H01M 8/0228* | (2016.01) | |
| *H01M 8/0243* | (2016.01) | |
| *H01M 8/0217* | (2016.01) | |
| *H01M 8/124* | (2016.01) | |

(52) U.S. Cl.
CPC ....... *H01M 8/0236* (2013.01); *H01M 8/1246* (2013.01); *H01M 8/2425* (2013.01); *H01M 8/0217* (2013.01); *H01M 8/0243* (2013.01); *H01M 2008/1293* (2013.01); *Y02E 60/50* (2013.01); *Y02E 60/521* (2013.01); *Y02E 60/525* (2013.01); *Y02P 70/56* (2015.11)

(56) References Cited

U.S. PATENT DOCUMENTS

| | | |
|---|---|---|
| 2007/0237999 A1 | 10/2007 | Donahue et al. |
| 2010/0209802 A1 | 8/2010 | Armstrong |
| 2011/0104586 A1 | 5/2011 | Tucker et al. |
| 2011/0287340 A1 | 11/2011 | Mougin |
| 2015/0030958 A1 | 1/2015 | Takata et al. |

FOREIGN PATENT DOCUMENTS

| | | |
|---|---|---|
| CN | 102067370 A | 5/2011 |
| CN | 102089912 A | 6/2011 |
| DE | 198 35 253 A1 | 1/2000 |
| JP | 2003-297387 A | 10/2003 |
| JP | 2004-319290 A | 11/2004 |
| JP | 2007-273429 A | 10/2007 |
| JP | 2008-034340 A | 2/2008 |
| JP | 2009-277411 A | 11/2009 |
| JP | 2010-080151 A | 4/2010 |
| JP | 2010-186645 A | 8/2010 |
| WO | WO 03/036739 A2 | 5/2003 |

\* cited by examiner

— CELL
— POROUS BODY
— DENSE BODY
— POROUS BODY
— CELL

ELECTRICAL CONNECTION MATERIAL FOR SOLID OXIDE FUEL CELL, SOLID OXIDE FUEL CELL, SOLID OXIDE FUEL CELL MODULE, AND METHOD FOR MANUFACTURING SOLID OXIDE FUEL CELL

CROSS REFERENCE TO RELATED APPLICATIONS

The present application is a divisional of application Ser. No. 14/159,601, filed Jan. 21, 2014, which is a continuation of International application No. PCT/JP2012/068217, filed Jul. 18, 2012, which claims priority to Japanese Patent Application No. 2011-159705, filed Jul. 21, 2011, the entire contents of each of which are incorporated herein by reference.

FIELD OF THE INVENTION

The present invention relates to an electrical connection material for solid oxide fuel cells, a solid oxide fuel cell, a solid oxide fuel cell module, and a method for manufacturing a solid oxide fuel cell.

BACKGROUND OF THE INVENTION

In recent years, there has been increasing attention to fuel cells as a new energy source. The fuel cells include solid oxide fuel cells (SOFC: Solid Oxide Fuel Cell), molten carbonate fuel cells, phosphoric-acid fuel cells, and solid polymer fuel cells. Among these fuel cells, for the solid oxide fuel cells, the use of liquid constituents is not always required, and internal reforming is possible in the case of using hydrocarbon fuels. For this reason, research and development on solid oxide fuel cells have been actively carried out.

For example, Patent Document 1 discloses, as an interconnector for solid oxide fuel cells, an interconnector formed from: a perovskite-type oxide represented by the general formula: $Ln_{1-x}Ae_xMO_{3-\delta}$ (1) (where Ln represents at least one element selected from lanthanoids, Ae represents one or two or more elements selected from the group consisting of Sr, Ba, and Ca, M represents one or two or more elements selected from the group consisting of Ti, Zr, Al, Ga, Nb, Ta, Fe, Co, Ni, Cu, Mn, Mg, Rh, Pd, Pt, and Au, $0 \leq x \leq 1$, and $\delta$ represents a value specified to meet the charge neutrality condition); and silica, in which the content percentage of the silica in the entire interconnector is 5 mass % to 14 mass %. In Patent Document 1, the interconnector has the function of electrically connecting fuel cells to each other. Patent Document 1 states that the use of the interconnector can suppress leakage of oxidant gas or fuel gas, because the interconnector described in Patent Document 1 has a dense structure.

Patent Document 1: Japanese Patent Application Laid-Open No. 2010-186645

SUMMARY OF THE INVENTION

However, the interconnector described in Patent Document 1 may fail to make a preferred electrical connection, and increase the electrical resistance in some cases.

The present invention has been achieved in view of the issue, and an object of the present invention is to provide an electrical connection material for solid oxide fuel cells, which is capable of preferred electrical connections.

An electrical connection material for solid oxide fuel cells according to the present invention includes a burn-out material-containing ceramic layer. The burn-out material-containing ceramic layer contains a conductive ceramic and a burn-out material.

In a particular aspect of the electrical connection material for solid oxide fuel cells according to the present invention, the electrical connection material for solid oxide fuel cells further includes a burn-out material-free ceramic layer. The burn-out material-free ceramic layer is stacked on the burn-out material-containing ceramic layer. The burn-out material-free ceramic layer contains a conductive ceramic, but no burn-out material.

In another particular aspect of the electrical connection material for solid oxide fuel cells according to the present invention, the electrical connection material for solid oxide fuel cells has at least one surface layer composed of the burn-out material-containing ceramic layer.

In still another particular aspect of the electrical connection material for solid oxide fuel cells according to the present invention, the conductive ceramic is at least one selected from the group consisting of lanthanum strontium manganite, lanthanum strontium cobaltite, and lanthanum strontium cobalt ferrite.

In yet another particular aspect of the electrical connection material for solid oxide fuel cells according to the present invention, the burn-out material is at least one selected from the group consisting of carbon and a polymer material.

A solid oxide fuel cell according to the present invention includes an electrical connection and a plurality of power generation cells. The electrical connection is obtained by firing the electrical connection material for solid oxide fuel cells according to the present invention. The electrical connection has a ceramic porous layer. The ceramic porous layer is obtained by firing the burn-out material-containing ceramic layer. The plurality of power generation cells are electrically connected to one another via the electrical connection.

In a particular aspect of the solid oxide fuel cell according to the present invention, the ceramic porous layer has a porosity within the range of 20% to 90%.

In another particular aspect of the solid oxide fuel cell according to the present invention, the electrical connection further includes a ceramic dense layer. The ceramic dense layer is stacked on the ceramic porous layer. The ceramic dense layer has a lower porosity than the porosity of the ceramic porous layer.

In still another particular aspect of the solid oxide fuel cell according to the present invention, the ceramic dense layer has a porosity of 0% to 20%.

In yet another particular aspect of the solid oxide fuel cell according to the present invention, the electrical porous layer has a thickness in a range of 0.40 times to 0.92 times the thickness of the electrical connection.

In further another particular aspect of the solid oxide fuel cell according to the present invention, the electrical connection has at least one surface layer composed of the ceramic porous layer.

A solid oxide fuel cell module according to the present invention includes the solid oxide fuel cell according to the present invention.

A method for manufacturing a solid oxide fuel cell according to the present invention relates to a method for manufacturing the solid oxide fuel cell according to the present invention. The method for manufacturing the solid oxide fuel cell according to the present invention includes a step of preparing a stacked body by stacking a plurality of power generation cells while an electrical connection material for solid oxide fuel cells is interposed therebetween, and firing the stacked body while applying pressure on the stacked body in the direction of stacking the power generation cells.

The present invention can provide an electrical connection material for solid oxide fuel cells, which is capable of preferred electrical connections.

DETAILED DESCRIPTION OF THE INVENTION

Figure 1:
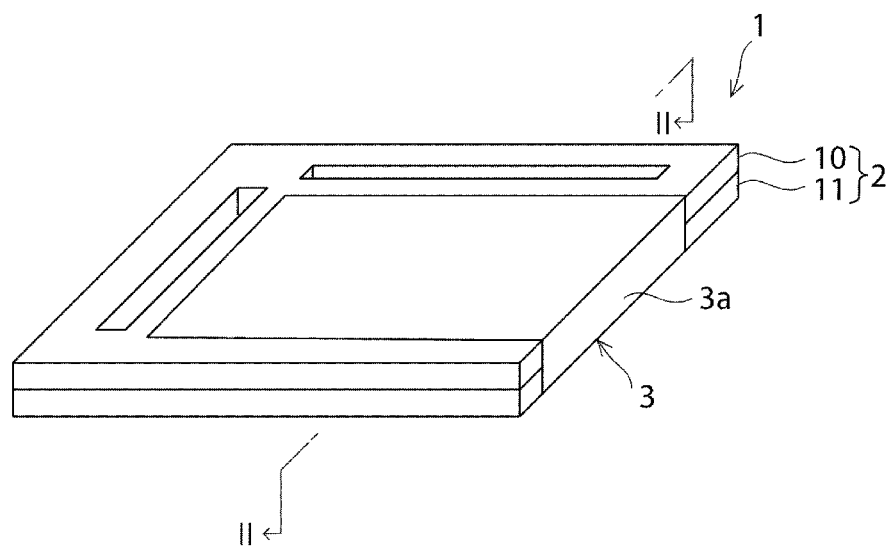
FIG. 1 is a schematic perspective view of a joint material for solid oxide fuel cells according to a first embodiment.

Examples of preferred embodiments for carrying out the present invention will be described below. However, the following embodiments are by way of example only. The present invention is not limited to the following embodiments in any way.

In the drawings referenced in the embodiments etc., members which have substantially the same functions will be referred to by the same reference numerals. In addition, the drawings referenced in the embodiments etc. are schematically illustrated, and dimensional ratios etc. for the objects drawn in the drawings may different from dimensional ratios etc. for real objects. The dimensional ratios etc. for the objects may be different between the drawings. Specific dimensional ratios etc. for the objects should be determined in view of the following description.

<<First Embodiment>>

Figure 2:
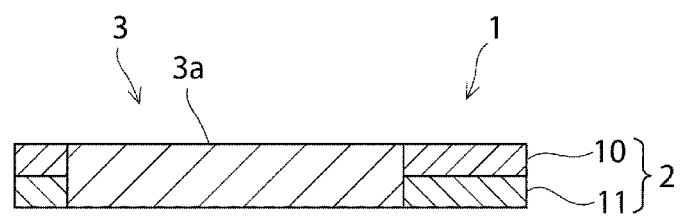
FIG. 2 is a schematic cross-sectional view of FIG. 1 along the line II-II.

FIG. 1 is a schematic perspective view of a joint material for solid oxide fuel cells according to a first embodiment. FIG. 2 is a schematic cross-sectional view of FIG. 1 along the line II-II.

The joint material 1 for solid oxide fuel cells is a joint material for use in a solid oxide fuel cell module. Specifically, for example, the joint material can be used for the application of joining and electrically connecting power generation cells to each other, the application of joining and electrically connecting a power generation cell of a fuel cell to a housing, etc.

The joint material 1 for solid oxide fuel cells includes a joint material body 2 and an electrical connection material 3.

(Joint Material Body 2)

The joint material body 2 mainly bears the function of joining members to be joined to each other. For this reason, the joint material body 2 is not particularly limited as long as it is possible to join members to be joined to each other in a preferred fashion. The joint material body 2 can be composed of, for example, a glass ceramic. In the present embodiment, an example will be described where the joint material body 2 is composed of a stacked body of a glass ceramic layer 10 and a constrained layer 11 provided on the glass ceramic layer 10.

The glass ceramic layer 10 contains a glass ceramic. The glass ceramic layer 10 may be composed of only a glass ceramic, or may contain, for example, an amorphous glass or the like in addition to a glass ceramic.

The "glass ceramic" herein is a mixed material of glass and ceramic.

In the present embodiment, the glass ceramic contains silica, a barium oxide, and alumina. The glass ceramic preferably contains 48 mass % to 75 mass % of Si in terms of $SiO_2$, 20 mass % to 40 mass % of Ba in terms of $BaO$, and 5 mass % to 20 mass % of Al in terms of $Al_2O_3$. The glass ceramic may further contain 2 mass % to 10 mass % of Mn in terms of $MnO$, 0.1 mass % to 10 mass % of Ti in terms of $TiO_2$, and 0.1 mass % to 10 mass % of Fe in terms of $Fe_2O_3$. The glass ceramic preferably contains substantially no Cr oxide or B oxide. In this case, a glass ceramic can be obtained which is able to be fired at a temperature of, for example, 1100° C. or lower.

The thickness of the glass ceramic layer 10 is not particularly limited, but preferably 10 μm to 150 μm, for example, more preferably 20 μm to 50 μm.

The constrained layer 11 is stacked on the glass ceramic layer 10. In the present embodiment, the constrained layer 11 and the glass ceramic layer 10 have direct contact with each other.

The constrained layer 11 is not fired or melted at the firing temperature of the glass ceramic layer 10. More specifically, the constrained layer 11 has such a property that can make the ceramic layer 10 fired while the constrained layer 11 is not substantially fired or melted. The constrained layer 11 is preferably composed of a metal plate or a ceramic.

For example, the constrained layer 11 preferably contains an inorganic material such as alumina, which is not sintered at the sintering temperature of the glass ceramic. In this case, the constrained layer 11 has such a property that can make the glass ceramic layer 10 sintered while the constrained layer 11 is not substantially shrunk. In addition, the constrained layer 11 preferably contains a glass. In this case, when the joint material 1 is subjected to sintering, the joint strength can be increased between the constrained layer 11 and the layer obtained by sintering the glass ceramic layer 10. Further, the inorganic material is preferably 5 μm or less in median particle diameter. When the median particle diameter of the inorganic material is larger than 5 μm, the effect of suppressing the shrinkage of the glass ceramic layer during firing may be reduced in some cases.

In the constrained layer 11, the volume of the glass is preferably 10% to 70% with respect to the total volume of the alumina and glass. The glass volume below 10% may result in an insufficient amount of glass in the constrained layer, thereby failing to densify the alumina and glass in some cases. The glass volume above 70% may diminish the shrinkage suppression effect during firing of the glass ceramic layer in some cases. The glass contained in the constrained layer 11 may be an amorphous glass, or composed of a glass at least partially crystallized during firing.

Alternatively, the constrained layer 11 may be composed of a metal plate with a plurality of through holes formed to penetrate in the thickness direction. Specifically, the constrained layer 11 may be composed of an expand metal, a punched metal, a woven metal wire, a foam metal, or the like.

The "expand metal" herein refers to a metal plate with quadrangle or polygonal openings formed in an oblique matrix, which is obtained by stretching, in one direction, a metal plate with incisions zigzag in the one direction, where a plurality of incision groups each with a plurality of linear incisions extending in the other direction and arranged at intervals in the other direction are arranged at intervals in the one direction perpendicular to the other direction.

The expanded metal preferably has a porosity of 30% to 86%, a line width of 30 μm to 250 μm, and a thickness of 30 μm to 500 μm.

The "punched metal" refers to a metal plate with a plurality of openings formed in a matrix form at predetermined intervals.

The punched metal is preferably 10% to 60% in porosity, 50 μm to 1000 μm in opening diameter, and 30 μm to 250 μm in thickness.

The "woven metal wire" refers to a member including: a plurality of first metal wires extending in one direction and arranged at intervals mutually in the other direction perpendicular to the one direction; and a plurality of second metal wires extending in the other direction, arranged at intervals mutually in the one direction, and crossing the plurality of first metal wires, where the plurality of first metal wires and the plurality of second metal wires are fixed in a thickness direction perpendicular to the one direction and the other direction. The "woven metal wire" includes both a member with a plurality of first metal wires and a plurality of second metal wires woven, and a member with a plurality of first metal wires and a plurality of second metal wires fixed by welding or the like, rather than woven.

The woven metal wire is preferably 50% to 85% in porosity, and 50 μm to 200 μm in wire diameter.

The "foam metal" refers to a metal member with a plurality of air holes therein. The foam metal may have a three-dimensional net-like structure. The air holes may be continuous holes or closed holes.

The foam metal preferably has a porosity of 10% to 70%.

When the constrained layer 11 is composed of a metal plate with a plurality of through holes formed, the constrained layer 11 preferably has a melting point of 900° C. or higher, and does not melt at the firing temperature of the glass ceramic layer 10. For this reason, the constrained layer 11 is preferably composed of a high-melting-point metal such as, for example, stainless steel, silver, gold, or nickel. The constrained layer 11 preferably has a melting point of 1100° C. or higher.

The constrained layer 11 is preferably 0.5 μm to 500 μm, and more preferably 1 μm to 300 μm in thickness. When the constrained layer 11 is less than 0.5 μm in thickness, the shrinkage suppression effect in the planar direction may be reduced in some cases. The constrained layer 11 with a thickness in excess of 500 μm is disadvantageous for lower-profile solid oxide fuel cells.

(Electrical Connection Material 3)

The electrical connection material 3 is placed in a different position from the joint material body 2 in a planar view (as viewed from the thickness direction of the joint material 1 for solid oxide fuel cells). The joint material body 2 described above mainly bears the function of joining members to be joined to each other, whereas the electrical connection material 3 has electrical conductivity, and bears the function of electrically connecting members to be connected, such as power generation cells, to each other.

The electrical connection material 3 includes a burn-out material-containing ceramic layer 3a. Specifically, the electrical connection material 3 is composed of only the burn-out material-containing ceramic layer 3a in the present embodiment.

The burn-out material-containing ceramic layer 3a contains a burn-out material in addition to a conductive ceramic. For this season, a porous body is formed by firing the burn-out material-containing ceramic layer 3a. In other words, the burn-out material-containing ceramic layer 3a is subjected to firing to turn into a ceramic body. Specifically, in the present embodiment, the burn-out material-containing ceramic layer 3a is subjected to firing to turn into a ceramic porous layer 7a as will be descried later in detail.

The conductive ceramic can be composed of at least one selected from the group consisting of lanthanum strontium manganite (LSM), lanthanum strontium cobaltite, and lanthanum strontium cobalt ferrite, for example.

The burn-out material is not particularly limited as long as the burn-out material is evaporated during firing. The burn-out material can be composed of, for example, one selected from the group consisting of carbon and polymer materials.

The content rate of the burn-out material in the electrical connection material 3 is preferably 20 volume percent to 90 volume percent, and preferably 40 volume percent to 80 volume percent.

(Method for Manufacturing Solid Oxide Fuel Cell Module)

Figure 3:
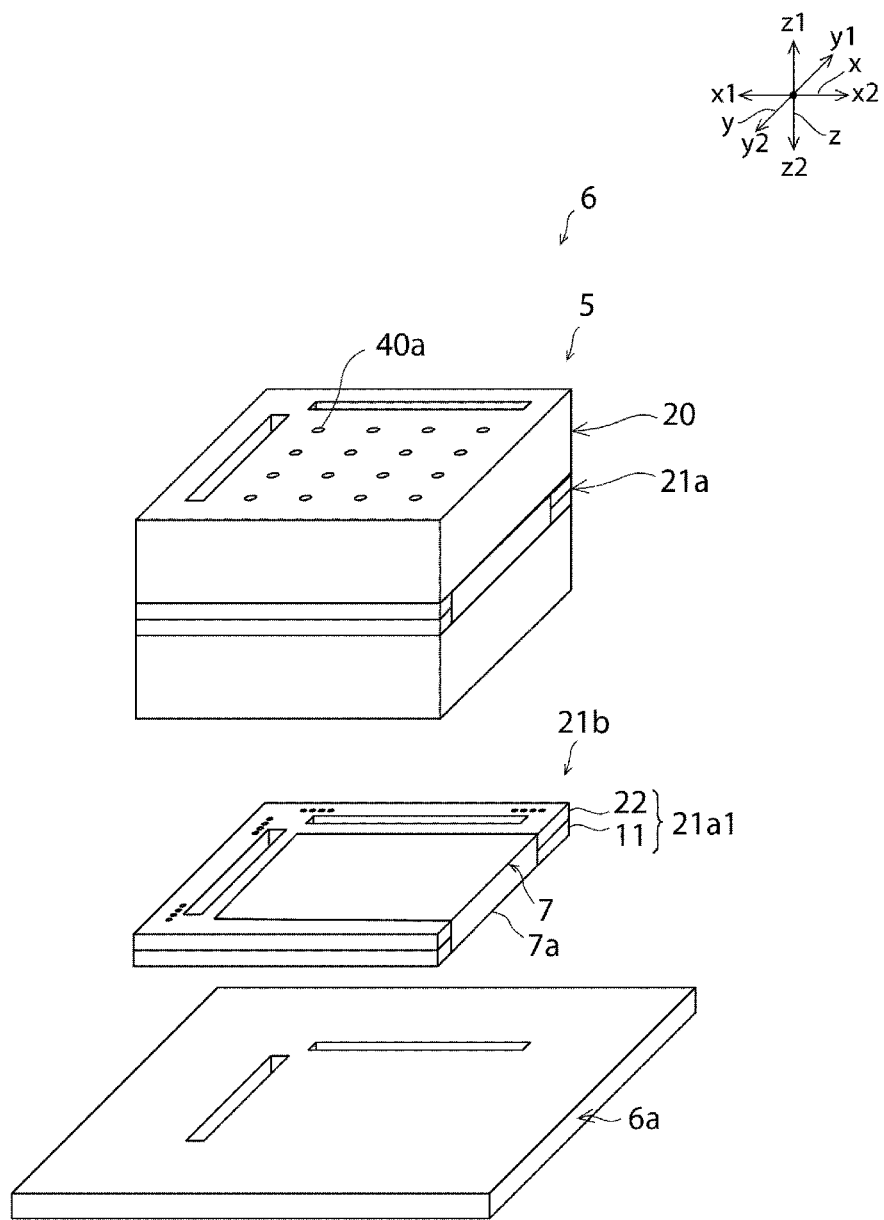
FIG. 3 is a schematic exploded perspective view of a portion of a solid oxide fuel cell module according to the first embodiment.
Figure 4:
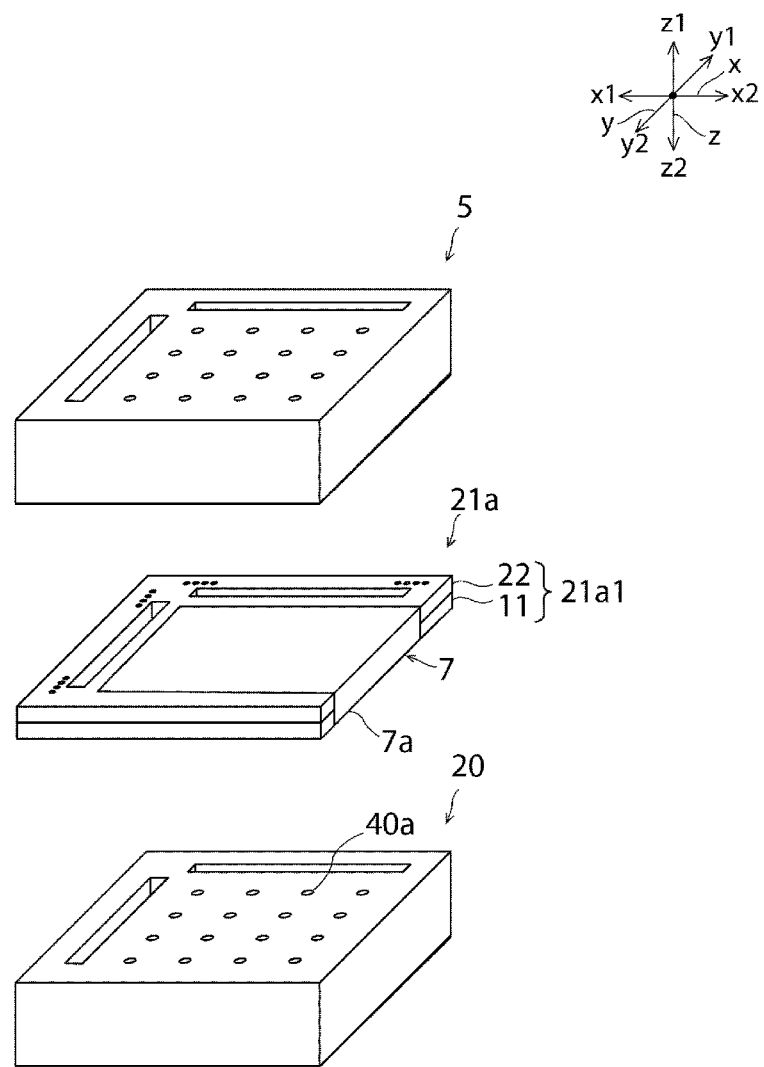
FIG. 4 is a schematic exploded perspective view of a solid oxide fuel cell according to the first embodiment.
Figure 5:
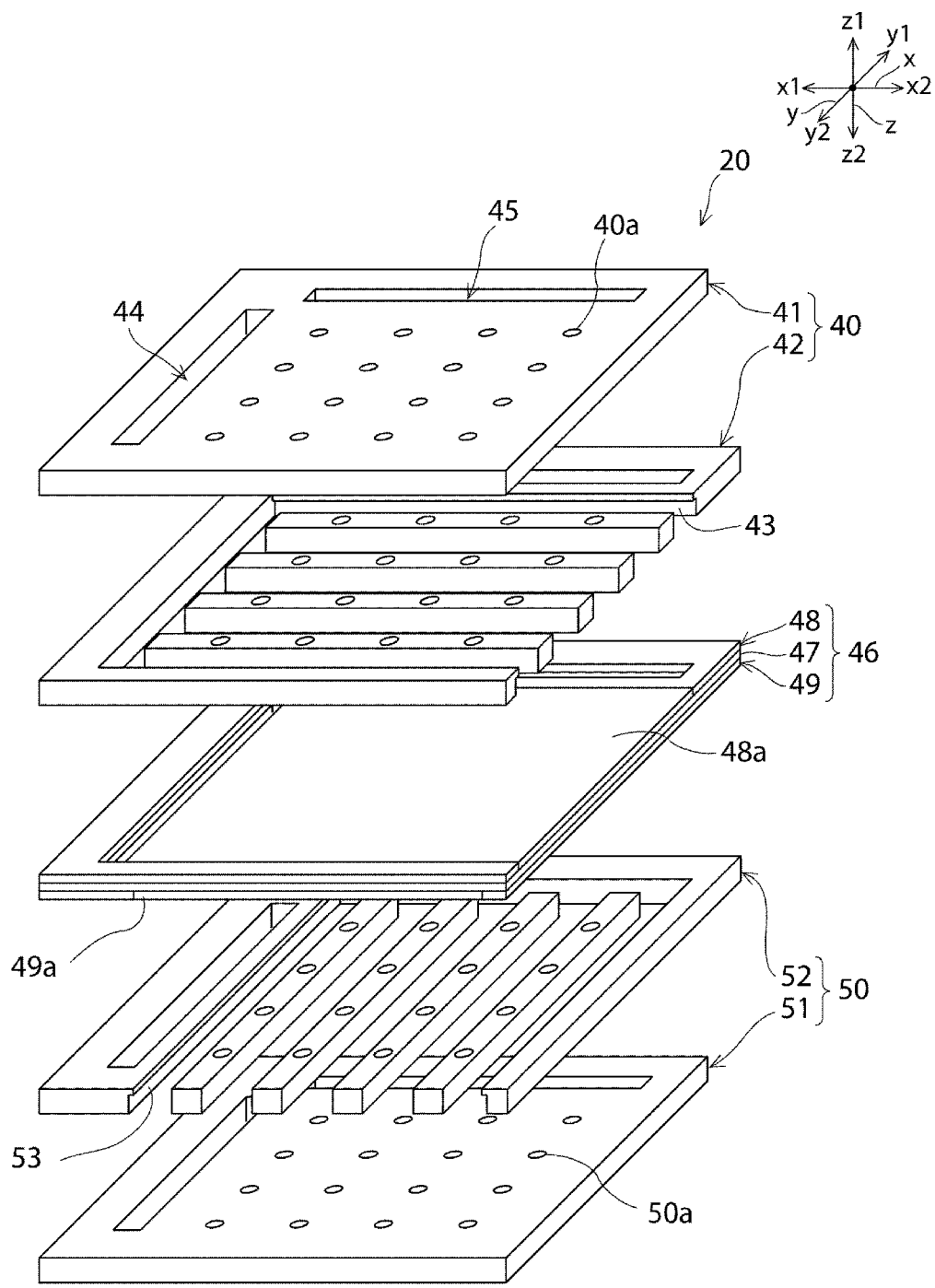
FIG. 5 is a schematic exploded perspective view of a power generation cell according to the first embodiment.

FIG. 3 is a schematic exploded perspective view of a portion of a solid oxide fuel cell module according to the first embodiment. In FIG. 3, the solid oxide fuel cell module is shown with a housing partially omitted. FIG. 4 is a schematic exploded perspective view of a solid oxide fuel cell according to the first embodiment. FIG. 5 is a schematic exploded perspective view of a power generation cell according to the first embodiment.

Next, a method for manufacturing a fuel cell module with the use of the joint material 1 for solid oxide fuel cells will be described mainly with reference to FIGS. 3 through 5.

As shown in FIG. 3, a solid oxide fuel cell module 6 to be manufactured according to the present embodiment includes a solid oxide fuel cell 5 and a housing 6a. The solid oxide fuel cell 5 is placed in the housing 6a. The solid oxide fuel cell 5 and the housing 6a are joined by a joint layer 21b, and electrically connected. Specifically, a joint layer body 21a1 of the joint layer 21b mainly joins the solid oxide fuel cell 5 and the housing 6a, and an electrical connection 7 electrically connects the solid oxide fuel cell 5 and the housing 6a.

As shown in FIG. 4, the solid oxide fuel cell 5 includes a plurality of power generation cells 20. Specifically, the solid oxide fuel cell 5 includes two power generation cells 20. The two power generation cells 20 are joined by the joint layer 21a, and electrically connected. Specifically, the joint layer body 21a1 of the joint layer 21a mainly joins the power generation cells 20 to each other, and the electrical connection 7 electrically connects the power generation cells 20 to each other.

As shown in FIG. 5, the power generation cell 20 includes a first separator 40, a power generation element 46, and a second separator 50. The power generation cell 20 has the first separator 40, power generation element 46, and second separator 50 stacked in this order.

The power generation cell 20 has a manifold 44 for oxidant gas supply and a manifold 45 for fuel gas supply, which are formed as through holes.

(Power Generation Element 46)

The power generation element 46 is a section for generating power by reaction of an oxidant gas supplied from the manifold 44 for oxidant gas supply with a fuel gas supplied from the manifold 45 for fuel gas supply. In this case, the oxidant gas can be composed of an oxidant gas such as, for example, air or oxygen gas. In addition, the fuel gas can be a hydrogen gas or a gas containing a hydrocarbon gas or the like such as a city gas, a liquefied petroleum gas, and a vaporized kerosene.

(Solid Oxide Electrolyte Layer 47)

The power generation element 46 includes a solid oxide electrolyte layer 47. The solid oxide electrolyte layer 47 preferably has high ion conductivity. For the solid oxide electrolyte layer 47, specific examples of stabilized zirconia include 10 mol % yttria stabilized zirconia (10YSZ) and 11 mol % scandia stabilized zirconia (11ScSZ). Specific examples of partially stabilized zirconia include 3 mol % yttria partially stabilized zirconia (3YSZ). In addition, the solid oxide electrolyte layer 47 can be also formed from, for example, a ceria-based oxide doped with Sm, Gd, or the like, or a perovskite-type oxide such as $La_{0.8}Sr_{0.2}Ga_{0.8}Mg_{0.2}O_{(3-\delta)}$ of $LaGaO_3$ as a matrix with La and Ga partially substituted with Sr and Mg respectively.

The solid oxide electrolyte layer 47 is sandwiched between an air electrode layer 48 and a fuel electrode layer 49. More specifically, the air electrode layer 48 is formed on one principal surface of the solid oxide electrolyte layer 47, whereas the fuel electrode layer 49 is formed on the other principal surface thereof.

(Air Electrode Layer 48)

The air electrode layer 48 has an air electrode 48a. The air electrode 48a is a cathode. At the air electrode 48a, oxygen takes in electrons to form oxygen ions. The air electrode 48a is preferably porous, highly electronically conductive, and less likely to develop an inter-solid reaction with the solid oxide electrolyte layer 47 or the like at high temperatures.

The air electrode 48a can be formed from, for example, scandia stabilized zirconia (ScSZ), an indium oxide doped with Sn, a $PrCoO_3$-based oxide, a $LaCoO_3$-based oxide, a $LaMnO_3$-based oxide, $La_{0.8}Sr_{0.2}Co_{0.2}Fe_{0.8}O_3$ (vernacular name: LSCF), etc. Specific examples of the $LaMnO_3$-based oxide include, for example, $La_{0.8}Sr_{0.2}MnO_3$ (vernacular name: LSM) and $La_{0.6}Ca_{0.4}MnO_3$ (vernacular name: LCM). The air electrode 48a may be composed of a mixed material obtained by mixing two or more of the materials mentioned above.

(Fuel Electrode Layer 49)

The fuel electrode layer 49 has a fuel electrode 49a. The fuel electrode 49a is an anode. At the fuel electrode 49a, oxygen ions react with the fuel gas to emit electrons. The fuel electrode 49a is preferably porous, highly electronically conductive, and less likely to develop an inter-solid reaction with the solid oxide electrolyte layer 47 or the like at high temperatures. The fuel electrode 49a can be composed of, for example, NiO, porous cermet of yttria stabilized zirconia (YSZ)—nickel metal, porous cermet of scandia stabilized zirconia (ScSZ)—nickel metal, etc. The fuel electrode layer 49 may be composed of a mixed material obtained by mixing two or more of the materials mentioned above.

(First Separator 40)

The first separator 40 composed of a first separator body 41 and a first flow channel forming member 42 is placed on the air electrode layer 48 of the power generation element 46. The first separator 40 has an oxidant gas flow channel 43 formed for supplying an oxidant gas to the air electrode 48a. This oxidant gas flow channel 43 extends from the manifold 44 for aerobic gas supply and from the x1 side toward the x2 side in the x direction.

The constituent material of the first separator 40 is not particularly limited. The first separator 40 can be formed from, for example, stabilized zirconia such as yttria stabilized zirconia, partially stabilized zirconia, etc.

The first separator 40 is provided with a via hole electrode 40a electrically connected to the air electrode 48a. This via hole electrode 40a extracts the air electrode 48a to the surface of the first separator 40 on the side opposite to the power generation element 46 side.

(Second Separator 50)

The second separator 50 composed of a second separator body 51 and a second flow channel forming member 52 is placed on the fuel electrode layer 49 of the power generation element 46. The second separator 50 has a fuel gas flow channel 53 formed for supplying a fuel gas to the fuel electrode 49a. This oxidant gas flow channel 53 extends from the manifold 45 for fuel gas supply and from the y1 side toward the y2 side in the y direction.

The constituent material of the second separator 50 is not particularly limited. The second separator 50 can be formed from, for example, stabilized zirconia, partially stabilized zirconia, etc.

The second separator 50 is provided with a via hole electrode 50a electrically connected to the fuel electrode 49a. This via hole electrode 50a extracts the fuel electrode 49a to the surface of the second separator 50 on the side opposite to the power generation element 46 side.

For manufacturing the solid oxide fuel cell module 6, first, the plurality of power generation cells 20 are prepared.

Next, a stacked body is prepared by stacking the plurality of power generation cells 20 while the joint material 1 for solid oxide fuel cells is interposed therebetween. This stacked body is subjected to firing while applying pressure in the direction (z direction) of stacking the power generation cells 20. Thus, the glass ceramic layer 10 is subjected to firing to form the joint layer body 21a1 composed of a stacked body of a fired layer 22 and the constrained layer 11. Thus, the plurality of power generation cells 20 are joined to one another.

When the burn-out material-containing ceramic layer 3a of the electrical connection material 3 is subjected to firing, the burn-out material contained in the burn-out material-containing ceramic layer 3a is evaporated. Thus, the ceramic porous layer 7a is formed from the burn-out material-containing ceramic layer 3a. The electrical connection 7 including the ceramic porous layer 7a electrically connects adjacent solid oxide fuel cells 5 to each other. Specifically, the electrical connection 7 including the ceramic porous layer 7a electrically connects the via hole electrode 40a of one solid oxide fuel cell 5 to the via hole electrode 50a of the other solid oxide fuel cell 5.

Next, the solid oxide fuel cells 5 are mounted on the housing 6a. Thus, the solid oxide fuel cell module 6 can be completed. Specifically, firing is carried out while applying pressure, with the joint material 1 for solid oxide fuel cells interposed between the housing 6a and the solid oxide fuel cell 5. Thus, the joint layer 21b including the joint layer body 21a1 and the electrical connection 7 is formed to join and electrically connect the housing 6a and the solid oxide fuel cell 5.

As described above, the electrical connection material 3 includes the burn-out material-containing ceramic layer 3a in the present embodiment. For this reason, in the firing step, the burn-out material-containing ceramic layer 3a is made porous to form the ceramic porous layer 7a. For this reason, when asperity is formed at the surfaces of the power generation cells 20, the ceramic porous layer 7a can be formed to have a shape corresponding to the asperity. Therefore, the contact resistance can be reduced between the electrical connection 7 and the power generation cells 20 or the like. Accordingly, an electrical connection can be made in a preferred manner between the power generation cells 20, or between the power generation cell 20 and the housing 6a. Therefore, the solid oxide fuel cell 5 and solid oxide fuel cell module 6 can be achieved which are high in power generation efficiency.

From the perspective of allowing more preferred electrical connection, the porosity of the ceramic porous layer 7a preferably falls within the range of 20% to 90%, more preferably within the range of 40% to 80%. If the ceramic porous layer 7a is excessively low in porosity, the contact resistance may be increased in some cases. On the other hand, if the ceramic porous layer 7a is excessively high in porosity, the electrical resistance of the ceramic porous layer 7a itself may be increased in some cases.

Examples of other preferred embodiments for carrying out the present invention will be described below. In the following description, members which share substantially common functions with those in the first embodiment will be denoted by common reference numbers, and descriptions of the members will be omitted.

<<Second to Fourth Embodiments>>

Figure 6:
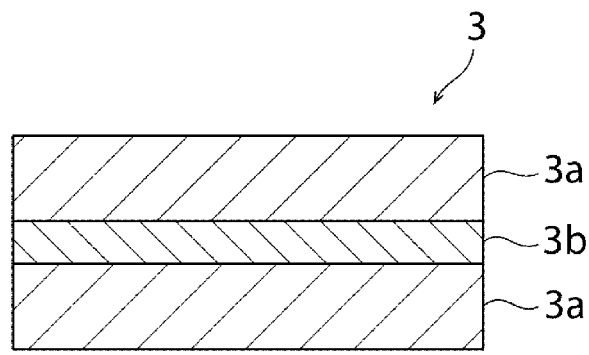
FIG. 6 is a schematic cross-sectional view of an electrical connection material according to a second embodiment.
Figure 7:
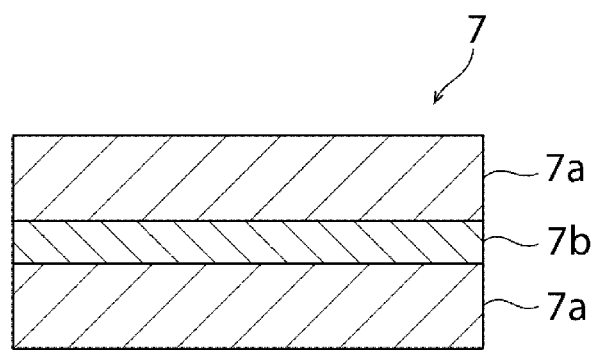
FIG. 7 is a schematic cross-sectional view of an electrical connection according to the second embodiment.
Figure 8:
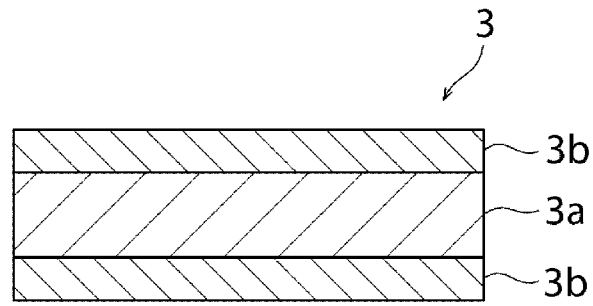
FIG. 8 is a schematic cross-sectional view of an electrical connection material according to a third embodiment.
Figure 9:
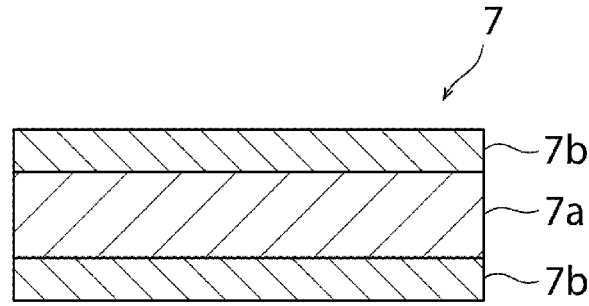
FIG. 9 is a schematic cross-sectional view of an electrical connection according to the third embodiment.
Figure 10:
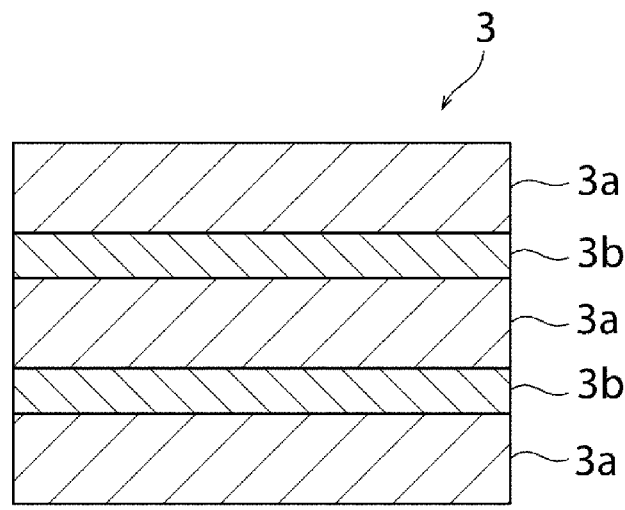
FIG. 10 is a schematic cross-sectional view of an electrical connection material according to a fourth embodiment.
Figure 11:
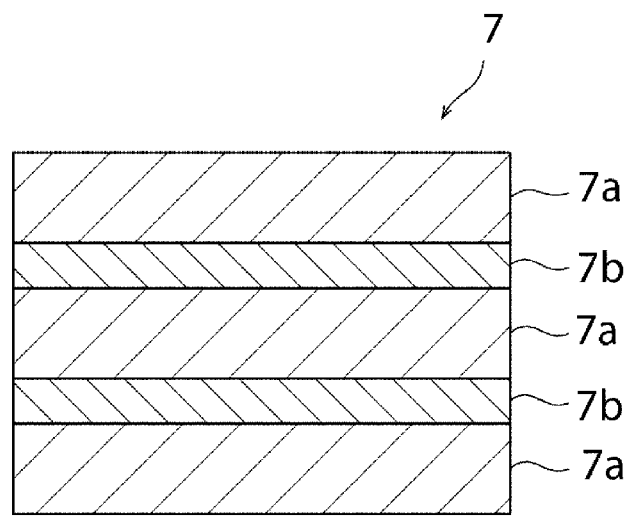
FIG. 11 is a schematic cross-sectional view of an electrical connection according to the fourth embodiment.

FIG. 6 is a schematic cross-sectional view of an electrical connection material according to a second embodiment. FIG. 7 is a schematic cross-sectional view of an electrical connection according to the second embodiment. FIG. 8 is a schematic cross-sectional view of an electrical connection material according to a third embodiment. FIG. 9 is a schematic cross-sectional view of an electrical connection according to the third embodiment. FIG. 10 is a schematic cross-sectional view of an electrical connection material according to a fourth embodiment. FIG. 11 is a schematic cross-sectional view of an electrical connection according to the fourth embodiment.

In the first embodiment, the example has been described in which the electrical connection material 3 composed of only the burn-out material-containing ceramic layer 3a is used to form the electrical connection 7 composed of only the ceramic porous layer 7a. However, the present invention is not limited to this configuration.

The electrical connection material 3 may be composed of a stacked body of at least one burn-out material-containing ceramic layer 3a and at least one burn-out material-free ceramic layer 3b containing a conductive ceramic and containing no burn-out material. In this case, when the electrical connection material 3 is subjected to firing, an electrical connection 7 is formed which is composed of a stacked body of a ceramic porous layer 7a and a ceramic dense layer 7b. The formation of the ceramic dense layer 7b as just described can lower the electrical resistance of the electrical connection 7 itself. Therefore, it becomes possible to achieve a solid oxide fuel cell and a solid oxide fuel cell module which are higher in power generation efficiency.

From the perspective of further lowering the electrical resistance of the electrical connection 7 itself, the porosity of the ceramic dense layer 7b is preferably 0% to 20%.

The total thickness of the ceramic porous layer 7a preferably falls within a range of 0.40 times to 0.92 times the thickness of the electrical connection 7, and the total thickness of the ceramic dense layer 7b preferably falls within a range of 0.60 times to 0.08 times the thickness of the electrical connection 7. In this case, the contact resistance can be reduced, and the electrical resistance of the electrical connection 7 itself can be also reduced.

For example, in the second embodiment as shown in FIG. 6, an electrical connection material 3 includes two burn-out material-containing ceramic layers 3a and a burn-out material-free ceramic layer 3b. The burn-out material-free ceramic layer 3b is placed between the two burn-out material-containing ceramic layers 3a. For this reason, the electrical connection material 3 has at least one surface layer composed of the burn-out material-containing ceramic layer 3a.

When the electrical connection material 3 according to the second embodiment is subjected to firing, an electrical connection 7 (see FIG. 7) is obtained which has two ceramic porous layers 7a and a ceramic dense layer 7b, and has the ceramic dense layer 7b placed between the two ceramic porous layers 7a.

Also in the second embodiment, the electrical connection material 3 has a surface layer composed of the burn-out material-containing ceramic layer 3a which is likely to be deformed during firing as in the first embodiment, and greater electrical connections can be thus achieved.

In the third embodiment as shown in FIG. 8, an electrical connection material 3 includes two burn-out material-free ceramic layers 3b and a burn-out material-containing ceramic layer 3a. The burn-out material-containing ceramic layer 3a is placed between the two burn-out material-free ceramic layers 3b.

When the electrical connection material 3 according to the third embodiment is subjected to firing, an electrical connection 7 (see FIG. 9) is obtained which has two ceramic dense layers 7b and a ceramic porous layer 7a, and has the ceramic porous layer 7a placed between the two ceramic dense layers 7b.

Even when the burn-out material-containing ceramic layer 3a is internally provided as in the third embodiment, great electrical connections can be achieved as in the first embodiment. However, in this case, the burn-out material-free ceramic layers 3b are preferably thinner than the burn-out material-containing ceramic layer 3a.

In the fourth embodiment as shown in FIG. 10, an electrical connection material 3 includes three burn-out material-containing ceramic layers 3a and two burn-out material-free ceramic layers 3b. The three burn-out material-containing ceramic layers 3a and the two burn-out material-free ceramic layers 3b are stacked so that the burn-out material-containing ceramic layers 3a and the burn-out material-free ceramic layers 3b are located alternately. The electrical connection material 3 has at least one surface layer composed of the burn-out material-containing ceramic layer 3a.

When the electrical connection material 3 according to the fourth embodiment is subjected to firing, an electrical connection 7 (see FIG. 11) is obtained which has ceramic porous layers 7a and ceramic dense layers 7b stacked alternately, and has a surface layer composed of the ceramic porous layer 7a.

Also in the fourth embodiment, the electrical connection material 3 has a surface layer composed of the burn-out material-containing ceramic layer 3a which is likely to be deformed during firing as in the first and second embodiments, and greater electrical connections can be thus achieved.

EXAMPLE 1

(Preparation of Electrical Connection Material)

Strontium carbonate ($SrCO_3$), lanthanum hydroxide (La$(OH)_3$), and manganese oxide ($Mn_3O_4$) as starting raw materials were weighed for the compositional proportions ($La_1$-$xSr_x$)$yMnO_2$, y=0.95, and x=0.0 to 0.2, and with the addition of water, subjected to grinding and mixing with zirconia balls, and this mixed powder was dried, and subjected to calcination at a temperature of 800 to 1000° C. to obtain a calcined powder of LSM.

The calcined powder obtained was mixed with a carbon powder as a burnt material, and then mixed with the addition of an organic solvent and a butyral-based binder to prepare slurry. From this slurry, sheets were formed by a doctor blade method. The plurality of sheets were stacked, and subjected to pressure bonding to prepare an electrical connection material configured in substantially the same fashion as the electrical connection material 3 according to the first embodiment.

(Preparation of Power Generation Cell)

Two power generation cells in accordance with the following conditions were prepared by co-firing.

Constituent Material of Separator: 3YSZ ($ZrO_2$ stabilized with 3 mol % of $Y_2O_3$ in additive amount)
Constituent Material of Solid Oxide Electrolyte Layer: ScSZ ($ZrO_2$ stabilized with 10 mol % of $Sc_2O_3$ and 1 mol % of $CeO_2$ in additive amount)
Constituent Material of Air Electrode: mixture of 60 mass % of $La_{0.8}Sr_{0.2}MnO_3$ powder and 40 mass % of ScSZ with 30 mass % of carbon powder added thereto
Constituent Material of Fuel Electrode: mixture of 65 mass % of NiO and 35 mass % of ScSZ with 30 mass % of carbon powder added thereto
Constituent Material of Interconnector on Fuel Electrode Side: mixture of 70 mass % of NiO and 30 mass % of $TiO_2$
Constituent Material of Interconnector on Air Electrode Side: Pd—Ag alloy of 30 mass % in Pd content
Diameter of Via Hole Electrode: 0.2 mm Thickness of Fuel Electrode: 30 μm
Thickness of Air Electrode: 30 μm
Thickness of Solid Oxide Electrolyte Layer: 30 μm
Height of Flow Channel Forming Section: 240 μm
Thickness of Separator Body: 360 μm (Preparation of Fuel Cell)

The two power generation cells prepared above with the electrical connection material prepared above interposed between the cells were subjected to firing at 1000° C. for 1 hour while applying a load of 1 kg by weight to prepare a fuel cell. The ceramic porous layer formed from the electrical connection material was 62% in porosity.

As a result of observing the interfaces between the power generation cells and the electrical connection in the prepared fuel cell with an electron microscope, substantially no gap was formed between the power generation cells and the electrical connection, with the generation cells and electrical connection closely attached. In addition, the area specific resistance (ASR) was 40 mΩcm$^2$ or less at the interfaces between the power generation cells and the electrical connection.

EXAMPLE 2

(Preparation of Electrical Connection Material)

Strontium carbonate ($SrCO_3$), lanthanum hydroxide (La$(OH)_3$), and manganese oxide ($Mn_3O_4$) as starting raw materials were weighed for the compositional proportions ($La_1$-$xSr_x$)$yMnO_3$, y=0.95, and x=0.0 to 0.2, and with the addition of water, subjected to grinding and mixing with zirconia balls, and this mixed powder was dried, and subjected to calcination at a temperature of 800 to 1000° C. to obtain a calcined powder of LSM.

The calcined powder obtained was mixed with a carbon powder as a burnt material, and then mixed with the addition of an organic solvent and a butyral-based binder to prepare slurry. From this slurry, sheets were formed by a doctor blade method. The plurality of sheets were stacked, and subjected to pressure bonding to the surface of a power generation cell, thereby providing a burn-out material-containing ceramic layer.

This layer was subjected to co-sintering at 1100° C. for 6 hours. The ceramic porous layer obtained by the co-sintering was 85 μm in thickness, and 47% in porosity.

Next, a binder of an ethyl cellulose resin was dissolved for 10 weight % in terpineol to prepare an organic vehicle for a conductive paste. With the addition of 30 weight % of the organic vehicle prepared previously to an LSM powder, the LSM powder was subjected kneading with three rolls to prepare an LSM paste. The paste of 30 μm in thickness was printed by a screen printing machine onto the ceramic porous layer at the cell surface. Thus, prepared was a power generation cell including the ceramic porous layer and burn-out material-free ceramic layer.

An electrical connection material configured in substantially the same fashion as the electrical connection material 3 according to the second embodiment was prepared by preparing two power generation cells each including the ceramic porous layer and the burn-out material-free ceramic layer as described above, and stacking the two power generation cells so as to overlap the non-burnt agent containing ceramic layers with each other.

(Preparation of Fuel Cell)

The two power generation cells prepared above with the electrical connection material prepared above interposed between the cells were subjected to firing at 1000° C. for 1 hour while applying a load of 1 kg by weight to prepare a fuel cell. The ceramic porous layer formed from the electrical connection material was 62% in porosity, whereas the ceramic dense layer was 8% in porosity.

Figure 12:
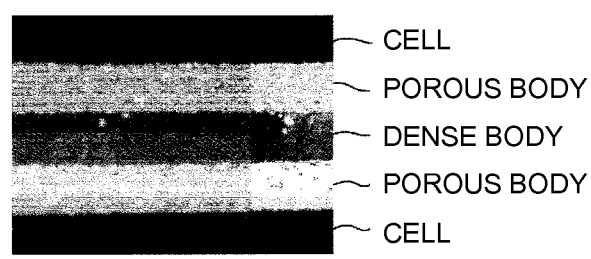
FIG. 12 is an electron micrograph of a cross section of an electrical connection formed in Example 2.

FIG. 12 is an electron micrograph of a cross section of the electrical connection formed in Example 2. From the micrograph shown in FIG. 12, it is determined that substantially no gap is formed at the interfaces between the power generation cells and the electrical connection, with the power generation cells and electrical connection closely attached. In addition, the area specific resistance (ASR) was 20 mΩcm$^2$ or less at the interfaces between the power generation cells and the electrical connection.

EXAMPLE 3

(Preparation of Electrical Connection Material)
<Porous>
Strontium carbonate (SrCO$_3$), lanthanum hydroxide (La(OH)$_3$), and manganese oxide (Mn$_3$O$_4$) as starting raw materials were weighed for the compositional proportions (La$_1$-xSrx)yMnO$_3$, y=0.95, and x=0.0 to 0.2, and with the addition of water, subjected to grinding and mixing with zirconia balls, and this mixed powder was dried, and subjected to calcination at a temperature of 800 to 1000° C. to obtain a calcined powder of LSM.

The calcined powder obtained was mixed with a carbon powder as a burnt material, and then mixed with the addition of an organic solvent and a butyral-based binder to prepare slurry. From this slurry, sheets were formed by a doctor blade method. The plurality of sheets were stacked to obtain a burn-out material-containing ceramic layer.
<Dense Body>
A binder of an ethyl cellulose resin was dissolved for 10 weight % in terpineol to prepare an organic vehicle for a conductive paste. With the addition of 30 weight % of the organic vehicle prepared previously to an LSM powder, the LSM powder was subjected kneading with three rolls to prepare an LSM paste. The paste of 30 μm in thickness was printed by a screen printing machine onto one surface for each of the two power generation cells and both surfaces of the burn-out material-containing ceramic layer to obtain the power generation cells with the dense body printed and the burnt agent-containing ceramic layer with the dense body printed.
<Stacking>
The power generation cells with the dense body printed, with the burn-out material-containing ceramic layer with the dense body printed between the cells, were subjected to firing for joining at 1000° C. for 1 hour while applying a load of 1 kg by weight/cm$^2$. In this case, the fired burn-out material-containing ceramic layer was 62% in porosity, whereas the dense body was 8% in porosity.
(Preparation of Fuel Cell)
The two power generation cells prepared above with the electrical connection material prepared above interposed between the cells were subjected to firing at 1000° C. for 1 hour while applying a load of 1 kg by weight to prepare a fuel cell.

Figure 13:
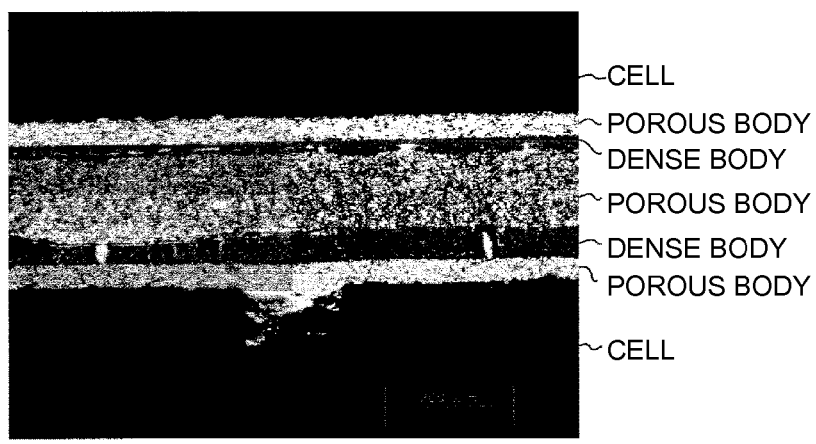
FIG. 13 is an electron micrograph of a cross section of an electrical connection formed in Example 3.

FIG. 13 is an electron micrograph of a cross section of the electrical connection formed in Example 3. From the micrograph shown in FIG. 13, it is determined that substantially no gap is formed at the interfaces between the power generation cells and the electrical connection, with the power generation cells and electrical connection closely attached. In addition, the area specific resistance (ASR) was 20 mΩcm$^2$ or less at the interfaces between the power generation cells and the electrical connection.

EXAMPLE 4

(Preparation of Electrical Connection Material)
<Porous>
Strontium carbonate (SrCO$_3$), lanthanum hydroxide (La(OH)$_3$), and manganese oxide (Mn$_3$O$_4$) as starting raw materials were weighed for the compositional proportions (La$_{1-x}$Sr$_x$)$_y$MnO$_3$, y=0.95, and x=0.0 to 0.2, and with the addition of water, subjected to grinding and mixing with zirconia balls, and this mixed powder was dried, and subjected to calcination at a temperature of 800 to 1000° C. to obtain a calcined powder of LSM.

The calcined powder obtained was mixed with a carbon powder as a burnt material, and then mixed with the addition of an organic solvent and a butyral-based binder to prepare slurry. From this slurry, LSM sheets were formed by a doctor blade method. The plurality of LSM sheets were stacked to obtain a burn-out material-containing ceramic layer.
<Dense Body>
A binder of an ethyl cellulose resin was dissolved for 10 weight % in terpineol to prepare an organic vehicle for a conductive paste. With the addition of 30 weight % of the organic vehicle prepared previously to an LSM powder, the LSM powder was subjected kneading with three rolls to prepare an LSM paste. The paste of 30 μm in thickness was printed by a screen printing machine onto both surfaces of the burn-out material-containing ceramic layer to obtain the burnt agent-containing ceramic layer with the dense body printed.

(Preparation of Power Generation Cell)
Two power generation cells in accordance with the following conditions were prepared by co-firing.
Constituent Material of Separator: 3YSZ (ZrO$_2$ stabilized with 3 mol % of Y$_2$O$_3$ in additive amount)
Constituent Material of Solid Oxide Electrolyte Layer: ScSZ (ZrO$_2$ stabilized with 10 mol % of Sc$_2$O$_3$ and 1 mol % of CeO$_2$ in additive amount)
Constituent Material of Air Electrode: mixture of 60 mass % of La$_{0.8}$Sr$_{0.2}$MnO$_3$ powder and 40 mass % of ScSZ with 30 mass % of carbon powder added thereto
Constituent Material of Fuel Electrode: mixture of 65 mass % of NiO and 35 mass % of ScSZ with 30 mass % of carbon powder added thereto
Constituent Material of Interconnector on Fuel Electrode Side: mixture of 70 mass % of NiO and 30 mass % of TiO$_2$
Constituent Material of Interconnector on Air Electrode Side: Pd—Ag alloy of 30 mass % in Pd content
Diameter of Via Hole Electrode: 0.2 mm
Thickness of Fuel Electrode: 30 μm
Thickness of Air Electrode: 30 μm
Thickness of Solid Oxide Electrolyte Layer: 30 μm
Height of Flow Channel Forming Section: 240 μm
Thickness of Separator Body: 360 μm
The power generation cells were obtained by co-sintering at 1100° C. for 6 hours.
<Stacking>
The power generation cells, with the burn-out material-containing ceramic layer with the dense body printed between the cells, were subjected to firing for joining at 1000° C. for 1 hour while applying a load of 1 kg by weight/cm$^2$. In this case, the fired burn-out material-containing ceramic layer was 62% in porosity, whereas the dense body was 8% in porosity.

Figure 14:
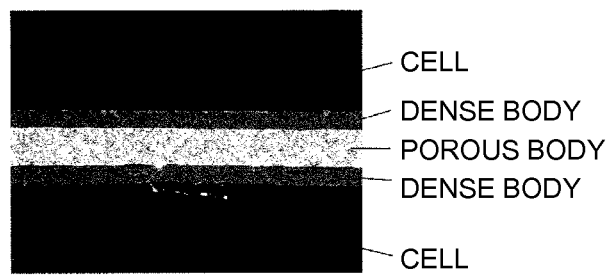
FIG. 14 is an electron micrograph of a cross section of an electrical connection formed in Example 4.

FIG. 14 is an electron micrograph of a cross section of the electrical connection formed in Example 4. From the micrograph shown in FIG. 14, it is determined that there is almost no gap between the power generation cells and the burn-out material-containing ceramic layer with the dense body printed, with the electrical connection closely attached. In addition, the area specific resistance (ASR) was 40 mΩcm$^2$ or less at the interfaces between the power generation cells and the electrical connection.

Figure 15:
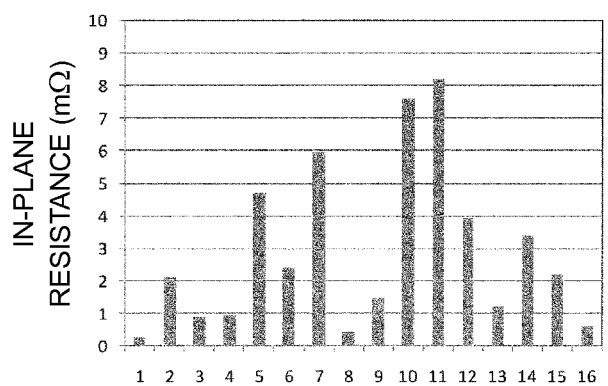
FIG. 15 is a graph showing variations in resistance value in the case of dividing an electrode plane into 16 parts in Example 4.

FIG. 15 shows variations in resistance value in the case of dividing the electrode plane into 16 parts in Example 4. The in-plane resistance varies in the range from less than 1 mΩ to about 8 mΩ.

EXAMPLE 5

(Preparation of Electrical Connection Material)
<Porous>

Strontium carbonate (SrCO$_3$), lanthanum hydroxide (La(OH)$_3$), and manganese oxide (Mn$_3$O$_4$) as starting raw materials were weighed for the compositional proportions (La$_{1-x}$Sr$_x$)$_y$MnO$_3$, y=0.95, and x=0.0 to 0.2, and with the addition of water, subjected to grinding and mixing with zirconia balls, and this mixed powder was dried, and subjected to calcination at a temperature of 800 to 1000° C. to obtain a calcined powder of LSM.

The calcined powder obtained was mixed with a carbon powder as a burnt material, and then mixed with the addition of an organic solvent and a butyral-based binder to prepare slurry. From this slurry, LSM sheets were formed by a doctor blade method. The plurality of LSM sheets were stacked to obtain a burn-out material-containing ceramic layer.

<Dense Body>

A binder of an ethyl cellulose resin was dissolved for 10 weight % in terpineol to prepare an organic vehicle for a conductive paste. With the addition of 30 weight % of the organic vehicle prepared previously to an LSM powder, the LSM powder was subjected kneading with three rolls to prepare an LSM paste. The paste of 30 μm in thickness was printed by a screen printing machine onto both surfaces of the burn-out material-containing ceramic layer, and the burn-out material-containing ceramic layer was further stacked on the both surfaces to obtain the pressure-bonded burn-out material-containing ceramic layers.

(Preparation of Power Generation Cell)

Two power generation cells in accordance with the following conditions were prepared by co-firing.

Constituent Material of Separator: 3YSZ (ZrO$_2$ stabilized with 3 mol % of Y$_2$O$_3$ in additive amount)

Constituent Material of Solid Oxide Electrolyte Layer: ScSZ (ZrO$_2$ stabilized with 10 mol % of Sc$_2$O$_3$ and 1 mol % of CeO$_2$ in additive amount)

Constituent Material of Air Electrode: mixture of 60 mass % of La$_{0.8}$Sr$_{0.2}$MnO$_3$ powder and 40 mass % of ScSZ with 30 mass % of carbon powder added thereto Constituent Material of Fuel Electrode: mixture of 65 mass % of NiO and 35 mass % of ScSZ with 30 mass % of carbon powder added thereto Constituent Material of Interconnector on Fuel Electrode Side: mixture of 70 mass % of NiO and 30 mass % of TiO$_2$ Constituent Material of Interconnector on Air Electrode Side: Pd—Ag alloy of 30 mass % in Pd content Diameter of Via Hole Electrode: 0.2 mm
Thickness of Fuel Electrode: 30 μm
Thickness of Air Electrode: 30 μm
Thickness of Solid Oxide Electrolyte Layer: 30 μm
Height of Flow Channel Forming Section: 240 μm
Thickness of Separator Body: 360 μm The power generation cells were obtained by co-sintering at 1100° C. for 6 hours.

<Stacking>

The power generation cells, with the burn-out material-containing ceramic layer between the cells, were subjected to firing for joining at 1000° C. for 1 hour while applying a load of 1 kg by weight/cm$^2$. In this case, the fired burn-out material-containing ceramic layer was 62% in porosity, whereas the dense body was 8% in porosity.

Figure 16:
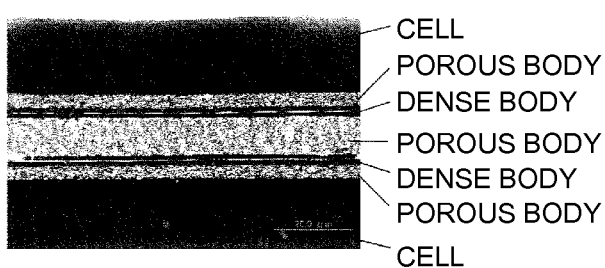
FIG. 16 is an electron micrograph of a cross section of an electrical connection formed in Example 5.

FIG. 16 is an electron micrograph of a cross section of the electrical connection formed in Example 5. From the micrograph shown in FIG. 16, it is determined that there is almost no gap between the power generation cells and the burn-out material-containing ceramic layer with the dense body printed, with the electrical connection closely attached. In addition, the area specific resistance (ASR) was 40 mΩcm$^2$ or less at the interfaces between the power generation cells and the electrical connection.

Figure 17:
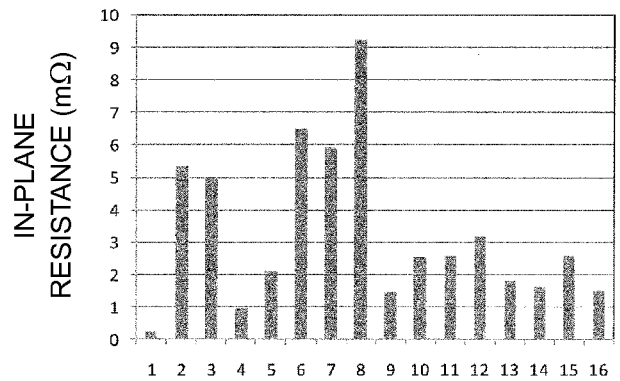
FIG. 17 is a graph showing variations in resistance value in the case of dividing an electrode plane into 16 parts in Example 5.

FIG. 17 shows variations in resistance value in the case of dividing the electrode plane into 16 parts in Example 5. The in-plane resistance varied in the range from less than 1 mΩ to about 9 mΩ.

EXAMPLE 6

(Preparation of Electrical Connection Material)
<Porous>

Strontium carbonate (SrCO$_3$), lanthanum hydroxide (La(OH)$_3$), and manganese oxide (Mn$_3$O$_4$) as starting raw materials were weighed for the compositional proportions (La$_{1-x}$Sr$_x$)$_y$MnO$_3$, y=0.95, and x=0.0 to 0.2, and with the addition of water, subjected to grinding and mixing with zirconia balls, and this mixed powder was dried, and subjected to calcination at a temperature of 800 to 1000° C. to obtain a calcined powder of LSM.

The calcined powder obtained was mixed with a carbon powder as a burnt material, and then mixed with the addition of an organic solvent and a butyral-based binder to prepare slurry. From this slurry, LSM sheets were formed by a doctor blade method. The plurality of LSM sheets were stacked to obtain a burn-out material-containing ceramic layer.

<Dense Body>

A binder of an ethyl cellulose resin was dissolved for 10 weight % in terpineol to prepare an organic vehicle for a conductive paste. With the addition of 30 weight % of the organic vehicle prepared previously to an LSM powder, the LSM powder was subjected kneading with three rolls to prepare an LSM paste.

(Preparation of Power Generation Cell)

Two power generation cells in accordance with the following conditions were prepared by co-firing.

Constituent Material of Separator: 3YSZ (ZrO$_2$ stabilized with 3 mol % of Y$_2$O$_3$ in additive amount)

Constituent Material of Solid Oxide Electrolyte Layer: ScSZ (ZrO$_2$ stabilized with 10 mol % of Sc$_2$O$_3$ and 1 mol % of CeO$_2$ in additive amount)

Constituent Material of Air Electrode: mixture of 60 mass % of La$_{0.8}$Sr$_{0.2}$MnO$_3$ powder and 40 mass % of ScSZ with 30 mass % of carbon powder added thereto Constituent Material of Fuel Electrode: mixture of 65 mass % of NiO and 35 mass % of ScSZ with 30 mass % of carbon powder added thereto Constituent Material of Interconnector on Fuel Electrode Side: mixture of 70 mass % of NiO and 30 mass % of TiO$_2$ Constituent Material of Interconnector on Air Electrode Side: Pd—Ag alloy of 30 mass % in Pd content Diameter of Via Hole Electrode: 0.2 mm
Thickness of Fuel Electrode: 30 μm
Thickness of Air Electrode: 30 μm
Thickness of Solid Oxide Electrolyte Layer: 30 μm
Height of Flow Channel Forming Section: 240 μm
Thickness of Separator Body: 360 μm This layer was subjected to co-sintering at 1100° C. for 6 hours.

Next, the LSM paste of 30 μm in thickness was printed by a screen printing machine onto the electrode sections at the cell surface. Thus, prepared was a power generation cell including the ceramic burn-out material-free ceramic layer.

<Stacking>

The power generation cells, with the burn-out material-containing ceramic layer between the cells, were subjected to firing for joining at 1000° C. for 1 hour while applying a load of 1 kg by weight/cm$^2$. In this case, the fired burn-out material-containing ceramic layer was 62% in porosity, whereas the dense body was 8% in porosity.

Figure 18:
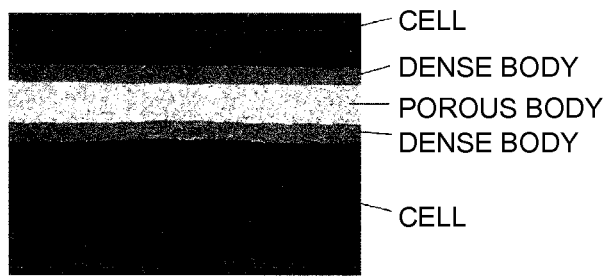
FIG. 18 is an electron micrograph of a cross section of an electrical connection formed in Example 6.

FIG. 18 is an electron micrograph of a cross section of the electrical connection formed in Example 6. From the micrograph shown in FIG. 18, it is determined that there is no gap between the dense layer printed on the surface of the power generation cell and the dense layer printed on the surface of the porous layer, with the power generation cells and electrical connection closely attached. In addition, the area specific resistance (ASR) was 20 mΩcm$^2$ or less at the interfaces between the power generation cells and the electrical connection.

Figure 19:
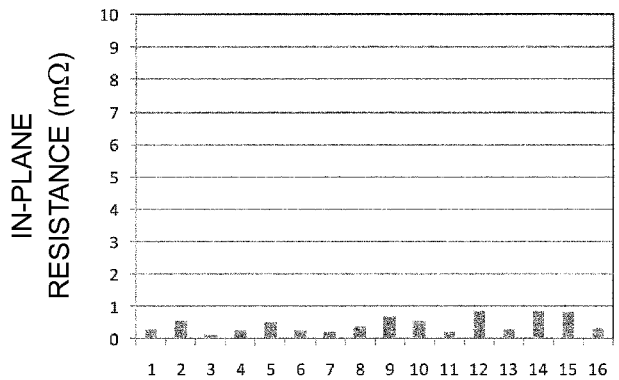
FIG. 19 is a graph showing variations in resistance value in the case of dividing an electrode plane into 16 parts in Example 6.

FIG. 19 shows variations in resistance value in the case of dividing the electrode plane into 16 parts in Example 6. The variation in in-plane resistance falls within the range of less than 1 mΩ for each part, and it was thus found that there were greater electrical junctions than in Examples 4 and 5.

EXAMPLE 7

(Preparation of Electrical Connection Material)
<Porous>

Strontium carbonate ($SrCO_3$), lanthanum hydroxide (La(OH)$_3$), and manganese oxide ($Mn_3O_4$) as starting raw materials were weighed for the compositional proportions ($La_{1-x}Sr_x)_yMnO_3$, y=0.95, and x=0.0 to 0.2, and with the addition of water, subjected to grinding and mixing with zirconia balls, and this mixed powder was dried, and subjected to calcination at a temperature of 800 to 1000° C. to obtain a calcined powder of LSM.

The calcined powder obtained was mixed with a carbon powder as a burnt material, and then mixed with the addition of an organic solvent and a butyral-based binder to prepare slurry. From this slurry, LSM sheets were formed by a doctor blade method. The plurality of LSM sheets were stacked to obtain a burn-out material-containing ceramic layer.

<Dense Body>

A binder of an ethyl cellulose resin was dissolved for 10 weight % in terpineol to prepare an organic vehicle for a conductive paste. With the addition of 30 weight % of the organic vehicle prepared previously to an LSM powder, the LSM powder was subjected kneading with three rolls to prepare an LSM paste.

(Preparation of Power Generation Cell)

Two power generation cells in accordance with the following conditions were prepared by co-firing.

Constituent Material of Separator: 3YSZ ($ZrO_2$ stabilized with 3 mol % of $Y_2O_3$ in additive amount)

Constituent Material of Solid Oxide Electrolyte Layer: ScSZ ($ZrO_2$ stabilized with 10 mol % of $Sc_2O_3$ and 1 mol % of $CeO_2$ in additive amount)

Constituent Material of Air Electrode: mixture of 60 mass % of $La_{0.8}Sr_{0.2}MnO_3$ powder and 40 mass % of ScSZ with 30 mass % of carbon powder added thereto Constituent Material of Fuel Electrode: mixture of 65 mass % of NiO and 35 mass % of ScSZ with 30 mass % of carbon powder added thereto Constituent Material of Interconnector on Fuel Electrode Side: mixture of 70 mass % of NiO and 30 mass % of $TiO_2$ Constituent Material of Interconnector on Air Electrode Side: Pd—Ag alloy of 30 mass % in Pd content Diameter of Via Hole Electrode: 0.2 mm
Thickness of Fuel Electrode: 30 μm
Thickness of Air Electrode: 30 μm
Thickness of Solid Oxide Electrolyte Layer: 30 μm
Height of Flow Channel Forming Section: 240 μm
Thickness of Separator Body: 360 μm The plurality of LSM sheets were stacked, and subjected to pressure bonding to the surface of the power generation cell to obtain an evaporative material-containing ceramic layer.

This layer was subjected to co-sintering at 1100° C. for 6 hours. The ceramic porous layer obtained by the co-sintering was 85 μm in thickness, and 47% in porosity.

Next, the LSM paste of 30 μm in thickness was printed by a screen printing machine onto the electrode section at the cell surface. Thus, prepared was a power generation cell including the ceramic burn-out material-free ceramic layer.

<Stacking>

The power generation cells, with the burn-out material-containing ceramic layer between the cells, were subjected to firing for joining at 1000° C. for 1 hour while applying a load of 1 kg by weight/cm$^2$. In this case, the fired burn-out material-containing ceramic layer was 62% in porosity, whereas the dense body was 8% in porosity.

Figure 20:
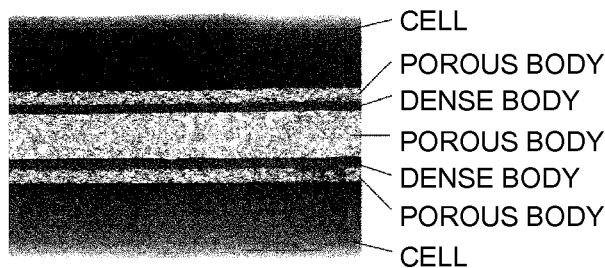
FIG. 20 is an electron micrograph of a cross section of an electrical connection formed in Example 7.

FIG. 20 is an electron micrograph of a cross section of the electrical connection formed in Example 7. From the micrograph shown in FIG. 20, it is determined that there is no gap between the dense layer printed on the surface of the power generation cell and the dense layer printed on the surface of the porous layer, with the power generation cells and electrical connection closely attached. In addition, the area specific resistance (ASR) was 20 mΩcm$^2$ or less at the interfaces between the power generation cells and the electrical connection.

Figure 21:
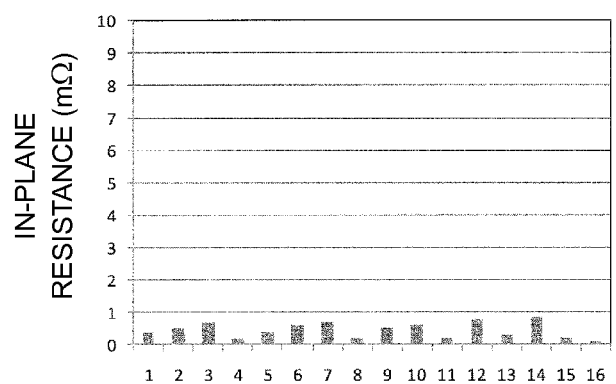
FIG. 21 is a graph showing variations in resistance value in the case of dividing an electrode plane into 16 parts in Example 7.

FIG. 21 shows variations in resistance value in the case of dividing the electrode plane into 16 parts in Example 7. The variation in in-plane resistance falls within the range of less than 1 mΩ for each part, and it was thus found that there were greater electrical junctions than in Examples 4 and 5.

DESCRIPTION OF REFERENCE SYMBOLS 1 joint material for solid oxide fuel cells
2 joint material body
3 electrical connection material
3a burn-out material-containing ceramic layer
3b burn-out material-free ceramic layer
5 solid oxide fuel cell
6 solid oxide fuel cell module
6a housing
7 electrical connection
7a ceramic porous layer
7b ceramic dense layer
10 glass ceramic layer 11 constrained layer
20 power generation cell
21a, 21b joint layer
21a1 joint layer body
22 fired layer
40 first separator
40a via hole electrode
41 first separator body
42 first flow channel forming member
43 oxidant gas flow channel
44 manifold for oxidant gas supply
45 manifold for fuel gas supply
46 power generation element
47 solid oxide electrolyte layer
48 air electrode layer
48a air electrode
49 fuel electrode layer
49a fuel electrode
50 second separator
50a via hole electrode
51 second separator body
52 second flow channel forming member
53 fuel gas flow channel

The invention claimed is:

1. A method for manufacturing a solid oxide fuel cell, the method comprising:
preparing an electrical connection material, the electrical connection material comprising a ceramic porous layer and a ceramic dense layer stacked on the ceramic porous layer, the ceramic dense layer having a porosity lower than a porosity of the ceramic porous layer;
preparing a stacked body by stacking a plurality of power generation cells with the electrical connection material interposed therebetween, each of the plurality of power generation cells comprising a first separator, a second separator and a power generation element between the first separator and the second separator, and the power generation element including an air electrode layer, a fuel electrode layer, a solid electrolyte layer between the air electrode layer and the fuel electrode layer; and
firing the stacked body while applying pressure on the stacked body in a direction of stacking the power generation cells.

2. The method for manufacturing a solid oxide fuel cell according to claim 1, wherein the ceramic porous layer has a porosity within a range of 20% to 90%.

3. The method for manufacturing a solid oxide fuel cell according to claim 2, wherein the ceramic dense layer has a porosity of 0% to 20%.

4. The method for manufacturing a solid oxide fuel cell according to claim 1, wherein the ceramic dense layer has a porosity of 0% to 20%.

5. The method for manufacturing a solid oxide fuel cell according to claim 1, wherein the ceramic porous layer has a thickness in a range of 0.40 times to 0.92 times a thickness of the electrical connection material after the firing.

6. The method for manufacturing a solid oxide fuel cell according to claim 1, wherein the ceramic porous layer comprises at least one surface of the electrical connection material.

\* \* \* \* \*